(12) United States Patent
Vanelli Tagliacani

(10) Patent No.: US 10,056,804 B2
(45) Date of Patent: Aug. 21, 2018

(54) APPARATUS FOR GENERATING ELECTRIC POWER FROM VEHICLES MOVING ON A ROAD

(71) Applicant: Cristina Vanelli Tagliacani, Milan (IT)

(72) Inventor: Cristina Vanelli Tagliacani, Milan (IT)

( * ) Notice: Subject to any disclaimer, the term of this patent is extended or adjusted under 35 U.S.C. 154(b) by 27 days.

(21) Appl. No.: 14/915,603

(22) PCT Filed: Aug. 26, 2014

(86) PCT No.: PCT/IB2014/064063
§ 371 (c)(1),
(2) Date: Feb. 29, 2016

(87) PCT Pub. No.: WO2015/028935
PCT Pub. Date: Mar. 5, 2015

(65) Prior Publication Data
US 2016/0226341 A1   Aug. 4, 2016

(30) Foreign Application Priority Data
Aug. 28, 2013 (IT) .............................. MI2013A1419

(51) Int. Cl.
| | |
|---|---|
| *F02B 63/04* | (2006.01) |
| *H02K 7/10* | (2006.01) |
| *H02K 7/18* | (2006.01) |
| *F03G 7/08* | (2006.01) |
| *H02K 7/02* | (2006.01) |
| *H02K 7/06* | (2006.01) |
| *H02K 7/116* | (2006.01) |
| *F16D 31/00* | (2006.01) |

(52) U.S. Cl.
CPC ............. *H02K 7/1853* (2013.01); *F03G 7/08* (2013.01); *H02K 7/02* (2013.01); *H02K 7/06* (2013.01); *H02K 7/116* (2013.01)

(58) Field of Classification Search
USPC .................................... 290/1 C, 1 R; 60/325
See application file for complete search history.

(56) References Cited

U.S. PATENT DOCUMENTS

| | | | | |
|---|---|---|---|---|
| 4,339,920 A | * | 7/1982 | Le Van ...................... | F03G 7/08 417/229 |
| 5,157,922 A | * | 10/1992 | Baruch ..................... | F03G 3/00 417/229 |
| 5,355,674 A | * | 10/1994 | Rosenberg ................ | F03G 3/00 290/1 R |

(Continued)

FOREIGN PATENT DOCUMENTS

| | | |
|---|---|---|
| GB | 2490888 A | 11/2012 |
| WO | WO 2008060274 A2 * 5/2008 | ............. B64C 27/14 |
| WO | 2010/085967 A1 | 8/2010 |

OTHER PUBLICATIONS

International Search Report in Corresponding PCT Application PCT/IB2014/064063, dated Mar. 17, 2015.

*Primary Examiner* — Pedro J Cuevas
(74) *Attorney, Agent, or Firm* — Hedman & Costigan, P.C.; James V. Costigan; Kathleen A. Costigan

(57) ABSTRACT

An apparatus for generating electric power from vehicles moving on a road comprises a movable element or assembly, arranged at a road surface, and thereon operate the wheels of a vehicle driven on the road surface, the movable element or assembly being operatively coupled to pressing means operating on electric current generating means.

2 Claims, 4 Drawing Sheets

(56) References Cited

U.S. PATENT DOCUMENTS

| | | | | |
|---|---|---|---|---|
| 6,494,144 B1* | 12/2002 | Perez Sanchez | ......... | F03G 7/08 |
| | | | | 104/287 |
| 6,756,694 B2* | 6/2004 | Ricketts | .................... | F03G 7/08 |
| | | | | 290/1 R |
| 6,858,952 B2* | 2/2005 | Gott | ......................... | F03G 7/08 |
| | | | | 290/1 R |
| 6,949,840 B2* | 9/2005 | Ricketts | .................... | F03G 7/08 |
| | | | | 290/1 A |
| 7,541,684 B1* | 6/2009 | Valentino | .................. | B60L 7/16 |
| | | | | 290/1 R |
| 7,629,698 B2* | 12/2009 | Horianopoulos | ......... | F03G 7/08 |
| | | | | 290/1 R |
| 8,123,431 B2* | 2/2012 | Chen | ........................ | E01C 9/00 |
| | | | | 290/1 R |
| 8,141,812 B2* | 3/2012 | Stamps | ................... | B64C 27/14 |
| | | | | 244/17.23 |
| 8,164,204 B2* | 4/2012 | Jang | ........................ | F03B 13/00 |
| | | | | 290/1 R |
| 8,356,768 B2* | 1/2013 | Stamps | ................... | B64C 27/14 |
| | | | | 244/17.23 |
| 8,901,759 B2* | 12/2014 | Pirisi | .................... | H02K 7/1876 |
| | | | | 290/1 R |
| 8,928,160 B2* | 1/2015 | Jang | ......................... | F03G 7/08 |
| | | | | 290/1 R |
| 9,287,753 B2* | 3/2016 | Jang | ......................... | F03G 7/08 |
| 2002/0089309 A1 | 7/2002 | Kenney | | |
| 2004/0160058 A1* | 8/2004 | Gott | ......................... | F03G 7/08 |
| | | | | 290/1 R |
| 2010/0314492 A1* | 12/2010 | Stamps | ................... | B64C 27/14 |
| | | | | 244/60 |
| 2011/0215593 A1* | 9/2011 | Chang | .................... | H02K 99/00 |
| | | | | 290/1 R |
| 2012/0180597 A1* | 7/2012 | Stamps | ................... | B64C 27/14 |
| | | | | 74/650 |

\* cited by examiner

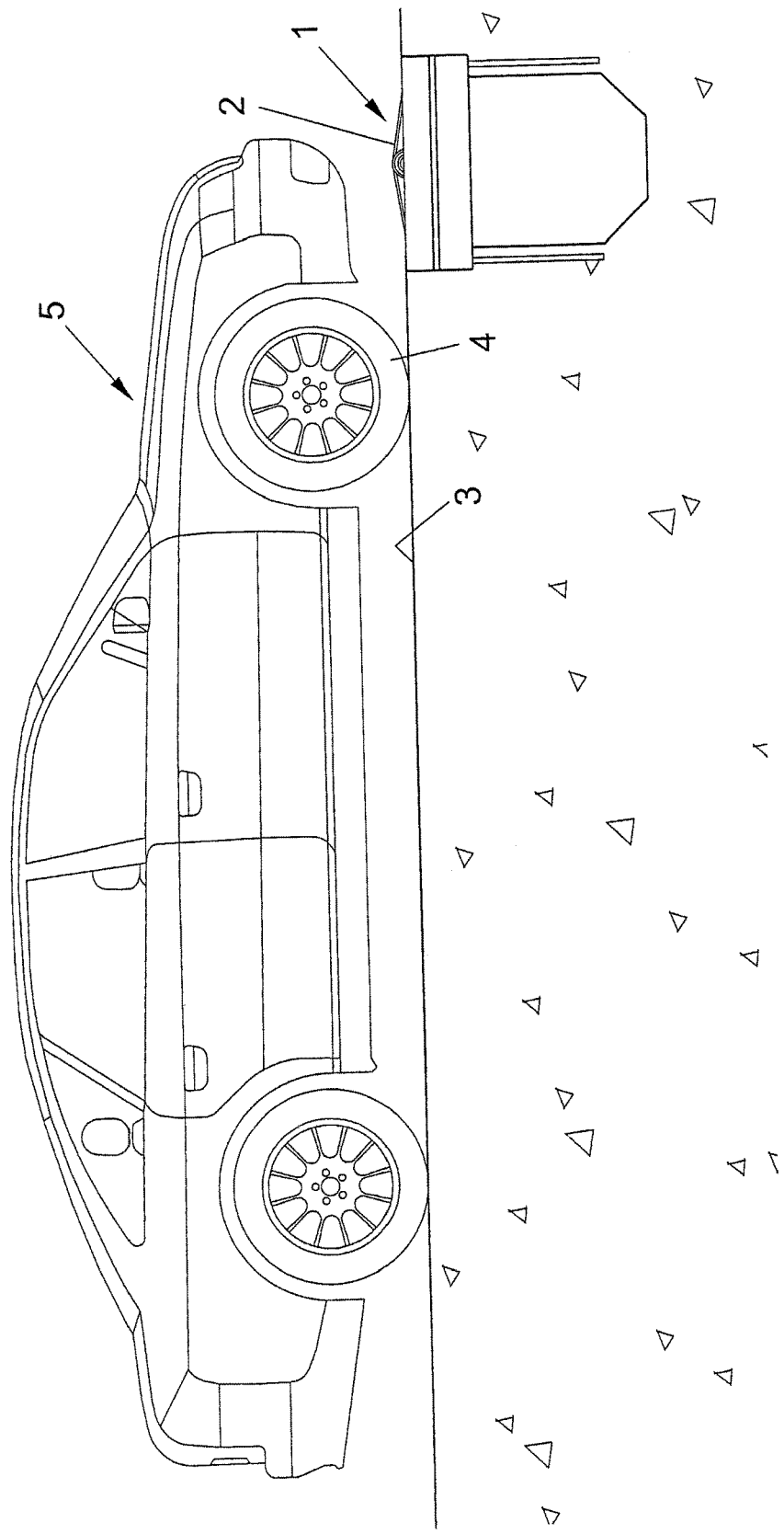

APPARATUS FOR GENERATING ELECTRIC POWER FROM VEHICLES MOVING ON A ROAD

BACKGROUND OF THE INVENTION

The present invention relates to an apparatus for generating electric power from vehicles moving on a road.

As is known, vehicles, such as cars, trucks, buses, motorcycles, trams and trains provide, in moving on a road surface, a pushing force which, depending on the vehicle weight, may also be of a comparatively large amount.

Also known is the fact that the vehicle traffic is continuously increasing.

However, the very large energy amount produced thereby is at present unused.

Document GB 2,490,888 A substantially discloses the preamble of claim 1.

SUMMARY OF THE INVENTION

The aim of the present invention is to provide an apparatus adapted to exploit the above energy, which latter may be considered as a renewable energy or power type.

Within the scope of the above mentioned aim, a main object of the invention is to provide such an electric power generating apparatus which has a very low cost and may be simply constructed.

Another object of the present invention is to provide such an electric power generating apparatus which requires small capital investments and may be both installed and serviced by conventional installing and servicing methods.

Yet another object of the present invention is to provide such an electric power generating apparatus which, owing to its specifically designed constructional features, is very reliable and safe in operation.

According to one aspect of the present invention, the above mentioned aim and objects, as well as yet other objects, which will become more apparent hereinafter, are achieved by an apparatus for generating electric power from vehicles moving on a road according to claim 1.

The apparatus according to the present invention generates an electric current by recovering completely unused energy deriving from a combination of forces comprising a gravitational pressure of a body on a surface, and a mechanical potential and kinetic energy of a vehicle in transit on a road.

The present apparatus is arranged under the road surface and comprises pressing means which, affected by the potential energy of a body and the kinetic energy on the soil on which the vehicle is driven, pick up and transfer said forces to a rotary system designed for multiplying them.

In particular, the pressure deriving from a combination of the above forces operating on said pressing means, which may be of a mechanical, pneumatic or hydraulic type, is transmitted through rotary multiplier means connected to the electric generating means.

Said electric generating means in turn comprise alternators, dynamos or other like electric power generating devices.

BRIEF DESCRIPTION OF THE DRAWINGS

Further characteristics and advantages of the present invention will become more apparent hereinafter from the following disclosure of a preferred, though not exclusive, embodiment of the invention, which is illustrated, by way of an indicative but not limitative example, in the accompanying drawings, where:

FIG. 4 is a partially cross-sectioned elevation view showing the apparatus in its use conditions.

DESCRIPTION OF THE PREFERRED EMBODIMENTS

Figure 1:
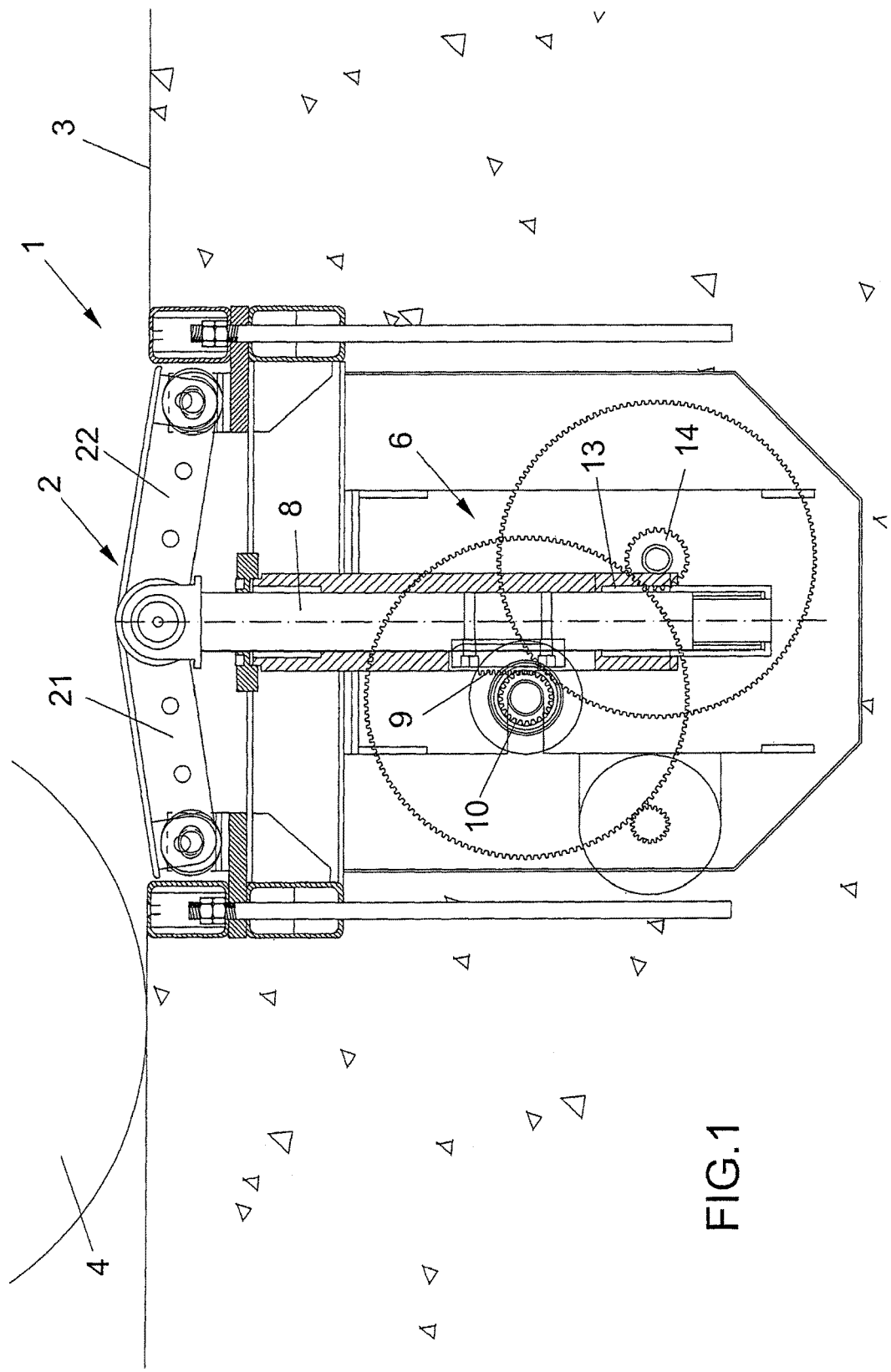
FIG. 1 is a cross-sectioned elevation view of the electric power generating apparatus shown in a stand by position thereof.
Figure 2:
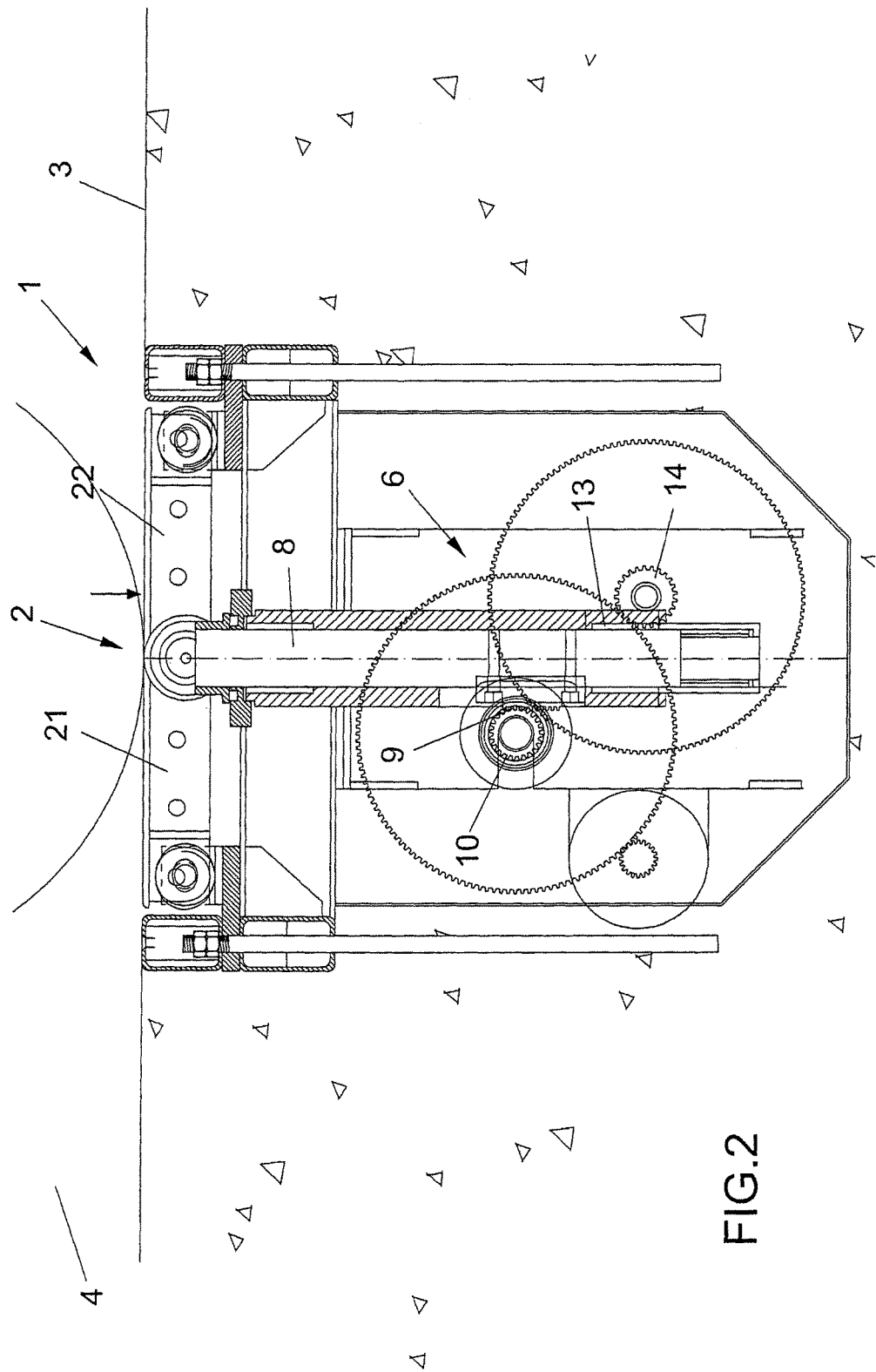
FIG. 2 is a view similar to FIG. 1 but showing the apparatus in an operating condition thereof.
Figure 3:
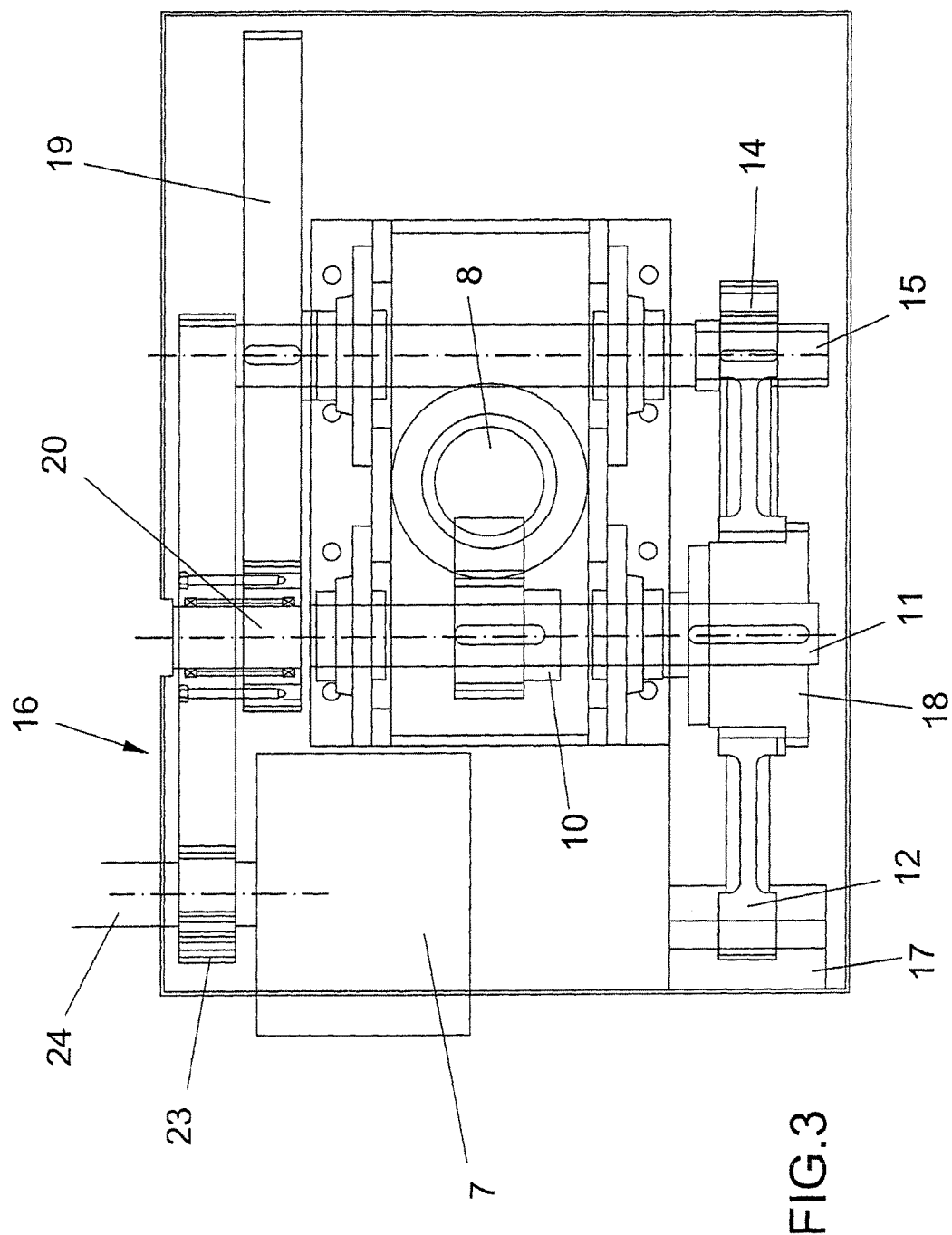
FIG. 3 is a top plan view of the inventive apparatus.

With reference to the number references of the above figures, the electric power generating apparatus according to the present invention, which has been generally indicated by the reference number 1, comprises a movable element or assembly 2 arranged at a road surface or mantle 3 thereon wheels 4 of vehicles 5 driven on the road surface operate.

Said movable element or assembly 2 is operatively coupled to pressing means, generally indicated by the reference number 6 and driving electric current generating means 7.

According to an embodiment of the present invention, said movable element or assembly 2 comprises a double plate 21 and 22 arrangement pivoted on a vertical axis 8, which may be vertically downward displaced when a wheel 4 of the vehicle 5 passes on said double plate 21, 22 arrangement.

Said vertical axis 8 comprises a first rack assembly 9, rotatively driving a first pinion 10 keyed on a first driving shaft 11 of a free gear wheel 12.

Said free gear wheel 12 in turn is coupled to a further free gear wheel 18 and a flywheel 17 which is so operatively pressed as to provide a continuous unidirectional rotary movement.

The gear wheel 12 engages a pinion 14 operatively driving a drive shaft 15 coupled to a gear wheel 19 in turn engaged with a further gear wheel 16 through a driving multiplier mechanism 20.

As shown, the gear wheel 16 engages with a pinion 23 operatively driving a further transmission or driving shaft 24 thereby operating the current generating means 7.

Said vertical axis 8 comprises moreover return means, consisting, for example, of a biasing spring, upward pushing said axis, after its downward movement caused by a vehicle passing on the movable assembly 2.

Thus, for each passage of a vehicle on the plates 21, 22 of the movable element or assembly 2, said axis 8 is downward and then upward displaced thereby causing said flywheel 17 to be continuously unidirectionally rotated, thereby continuously operating on said current generating means or generator 7.

It has been found that the invention fully achieves the intended aim and objects.

In fact, the invention has provided an electric power generating apparatus operating to recover a great amount of mechanical power or energy, which at present is unused.

The vehicle energy may be also recovered by hydraulic or pneumatic means not shown herein, arranged either before or after the rotary mechanism or as a replacement or an addition to said mechanism.

In such a case, the pressure applied on the hydraulic or pneumatic pistons is transferred to a fluid which, through dedicated fluid ducts, will operate pumps in turn driving means for transforming mechanical power into electric power.

In this connection it should be apparent that the materials used and contingent size may be changed depending on the machine casings or operating requirements thereof so as to maximize the received pressing force or to distribute said force to a plurality of operating sub-assemblies.

The above apparatus, designed in a block form, allows to transfer the movement energy to a plurality of associated electric generators.

The vehicle mechanical energy being transferred to the electric generating means and then being either accumulated or sent to the mains.

The inventive combined apparatus may also be driven by hydraulic or pneumatic means.

In practicing the invention, the materials used and size may be any, depending on requirements.

The invention claimed is:

1. An apparatus (1) for generating electric power from a vehicle moving on a road, comprising a movable assembly (2) arranged at a road surface (3) and thereon operate wheels of said vehicle driven on said road surface (3), said movable assembly (2) being operatively coupled to pressing means (6) operating on power generating means (7), said movable assembly (2) comprises a double plate arrangement (21, 22), each said plate having a respective end portion pivoted onto a same vertical axis, adapted to be downward vertically displaced as the wheels (4) of said vehicle (5) pass on said double plate (21, 22) arrangement, said vertical axis comprising return means, upward pushing said vertical axis (8), after its downward movement caused by said vehicle (5) passing on said movable assembly, said vertical axis (8) comprising a first rack assembly (9) rotatively driving a rotary mechanism comprising a first pinion (10) keyed on a first driving shaft (11) associated with a free gear wheel (12), wherein said free gear wheel (12) is coupled to a flywheel (17) which is operatively pressed to provide a continuous unidirectional rotary movement, wherein said free gear wheel (12) engages a pinion (14) operatively driving a driveshaft (15) coupled to an additional gear wheel (19) which in turn is engaged with a further additional gear wheel (16) through a multiplier mechanism (20), wherein said further additional gear wheel (16) engages a further pinion (23) driving a drive axis (24) in turn driving said power generating means, and wherein, as said vertical axis (8) is reciprocated, said pinions are alternately rotated while said flywheel (17) is unidirectionally turned for operating said power generating means (7), thereby, for each vehicle (5) passing on said movable assembly (2), said vertical axis is downward and then upward displaced thereby continuously unidirectionally driving said flywheel (17) in turn continuously driving said power generating means.

2. An apparatus, according to claim 1, characterized in that said power generating means (7) comprise electric power generating means, in particular an alternator or a dynamo.

* * * * *